US007753994B2

United States Patent
Motegi et al.

(10) Patent No.: US 7,753,994 B2
(45) Date of Patent: Jul. 13, 2010

(54) DISCHARGE DEVICE AND AIR PURIFIER

(75) Inventors: Kanji Motegi, Osaka (JP); Kenkichi Kagawa, Osaka (JP); Toshio Tanaka, Osaka (JP); Ryuji Akiyama, Osaka (JP)

(73) Assignee: Daikin Industries, Ltd., Osaka (JP)

( * ) Notice: Subject to any disclaimer, the term of this patent is extended or adjusted under 35 U.S.C. 154(b) by 1041 days.

(21) Appl. No.: 10/585,331

(22) PCT Filed: Jan. 12, 2005

(86) PCT No.: PCT/JP2005/000230

§ 371 (c)(1),
(2), (4) Date: Jul. 6, 2006

(87) PCT Pub. No.: WO2005/069460

PCT Pub. Date: Jul. 28, 2005

(65) Prior Publication Data
US 2009/0193976 A1    Aug. 6, 2009

(30) Foreign Application Priority Data
Jan. 13, 2004   (JP) ............................... 2004-005221
Sep. 30, 2004   (JP) ............................... 2004-287470

(51) Int. Cl.
*B03C 3/40*   (2006.01)
*B03C 3/64*   (2006.01)

(52) U.S. Cl. ...................... 96/80; 96/83; 96/95; 96/96; 96/97; 96/98; 313/311

(58) Field of Classification Search ............... 96/21, 96/22, 80, 82, 96, 97, 83, 95, 98–100; 95/6; 323/903; 361/225–235; 313/309, 311, 352, 313/355
See application file for complete search history.

(56) References Cited

U.S. PATENT DOCUMENTS

| 1,934,923 | A | * | 11/1933 | Heinrich | 95/81 |
| 2,280,330 | A | * | 4/1942 | White | 96/82 |
| 3,188,784 | A | * | 6/1965 | Nodolf | 96/22 |
| 4,274,843 | A | * | 6/1981 | Sone et al. | 96/82 |
| 4,376,637 | A | * | 3/1983 | Yang | 95/74 |
| 4,540,970 | A |   | 9/1985 | Kasamatsu | |
| 4,651,264 | A | * | 3/1987 | Shiao-Chung Hu | 363/18 |
| 5,639,294 | A | * | 6/1997 | Ranstad | 95/6 |
| 6,664,741 | B1 | * | 12/2003 | Krichtafovitch | 315/111.91 |
| 6,963,479 | B2 | * | 11/2005 | Krichtafovitch | 361/226 |
| 7,270,698 | B2 | * | 9/2007 | Tanaka et al. | 96/95 |
| 7,332,020 | B2 | * | 2/2008 | Tanaka et al. | 96/66 |
| 7,377,962 | B2 | * | 5/2008 | Tanaka et al. | 96/83 |

(Continued)

FOREIGN PATENT DOCUMENTS

JP    59-127339 A    7/1984

(Continued)

*Primary Examiner*—Richard L Chiesa
(74) *Attorney, Agent, or Firm*—Birch, Stewart, Kolasch, & Birch, LLP.

(57) ABSTRACT

In a discharge device for performing streamer discharge between a discharge electrode (41) including a plurality of discharge parts (61) and a counter electrode (42) including a plurality of counter parts (62) confronting the discharge parts (61), a resistor (60) is provided in a current carrying path between power source means (45) and the discharge parts (61).

5 Claims, 12 Drawing Sheets

U.S. PATENT DOCUMENTS

| | | | |
|---|---|---|---|
| 7,465,339 B2 * | 12/2008 | Tanaka et al. | 96/52 |
| 7,569,100 B2 * | 8/2009 | Tanaka et al. | 96/18 |
| 2005/0061152 A1 * | 3/2005 | Liu | 96/80 |
| 2007/0193448 A1 * | 8/2007 | Tanaka et al. | 96/18 |
| 2008/0078295 A1 * | 4/2008 | Leng et al. | 96/77 |

FOREIGN PATENT DOCUMENTS

| | | |
|---|---|---|
| JP | 06-150802 A | 5/1994 |
| JP | 8-179590 A | 7/1996 |
| JP | 2000-103605 A | 4/2000 |
| JP | 2002-198160 A | 7/2002 |
| JP | 2002-336689 A | 11/2002 |
| JP | 2003-53129 A | 2/2003 |

* cited by examiner (A)

(B)

(C)

(D)

DISCHARGE DEVICE AND AIR PURIFIER

This Application is the national phase of PCT International Application No. PCT/JP05/000230, filed on Jan. 12, 2005. The entire contents of each of the above-identified applications are hereby incorporated by reference.

TECHNICAL FIELD

The present invention relates to a discharge device for performing streamer discharge between a discharge electrode and a counter electrode and an air purifier including the discharge device, and particularly relates to a technology for suppressing a spark in the discharge device.

BACKGROUND ART

Conventionally, air purifiers including a discharge device are utilized as means for decomposing and removing odor components, injurious components, and the like in air by plasma generated by discharge. Of the air purifiers, an air purifier of streamer discharge type can obtain high air purifying efficiency at comparatively low power consumption, and therefore, can be said as a technology suitable for performing decomposition of injurious components and deodorization.

For example, as indicated in Patent Document 1 (Japanese Patent Application Laid Open Publication No. 2002-336689A), an air purifier of streamer discharge type includes, as a discharge device, a discharge electrode having a plurality of needle-shaped discharge parts, a counter electrode having counter parts confronting the discharge parts, and the power source means for applying voltage to both the electrodes. With such an arrangement of the discharge device, when voltage is applied to both the electrodes by power source means, streamer discharge is performed between the electrodes to generate low temperature plasma. Then, active species (high-energy electrons, ions, radicals, other excitons, and the like) generated in association with the generation of the low temperature plasma are allowed to flow and be in contact with injurious components or odor components in the to-be-treated air. Thus, these components are decomposed and removed.

MEANS OF SOLVING PROBLEMS

However, while the discharge device of streamer discharge type disclosed in Patent Document 1 exhibits high decomposition efficiency to the odor components and the injurious components, the state of the streamer discharge (an amount of streamer discharge generated and a state of generation thereof) thereof is sensitive and is liable to be influenced by various factors. The influence factors include distances between the discharge parts and the counter parts, the shape of the discharge parts, adhesion of dust to the surface of a discharge part or a counter part, and the like. If the discharge characteristic of a discharge part would change due to any of these influence factors, sparks may occur from the discharge part towards a corresponding counter part. As a result, no streamer discharge is performed, reducing an amount of low temperature plasma generated to lower the air purifying efficiency. In addition, the user may feel the sparks as noise, and electromagnetic waves, which accompanies the generation of sparks, may invite malfunction of electronic appliances arranged in the vicinity of the discharge device. In order to effectively obtain the high air purifying efficiency in the discharge device of streamer discharge type, it is key to suppression of occurrence of the foregoing sparks for performing stable streamer discharge.

The present invention has been made in view of the foregoing and has its object of suppressing occurrence of sparks in a discharge device of streamer discharge type for performing stable streamer discharge in an air purifier including the discharge device.

DISCLOSURE OF INVENTION

The present invention provides a discharge device for performing streamer discharge between a discharge electrode and a counter electrode, wherein spark occurrence in the streamer discharge can be suppressed by providing a resistor in a current carrying path between power source means and discharge parts or between the power source means and counter parts.

Specifically, a first invention presumes a discharge device, which includes a discharge electrode (41) including a plurality of discharge parts (61) and a counter electrode (42) including a plurality of counter parts (62) confronting the discharge parts (61), for performing streamer discharge by applying voltage to both the electrodes (41, 42) by power source means (45). Wherein, the discharge device is characterized in that a resistor (60) is provided in a current carrying path between the power source means (45) and the discharge parts (61).

Herein, a factor of spark occurrence between the electrodes (41, 42) at the streamer discharge will be described.

In a discharge device including a plurality of discharge parts (61) and a plurality of counter parts (62) corresponding to the discharge parts (61), each pair of the discharge parts (61) and the counter parts (62) has a discharge characteristic (a relationship between discharge current (I) and voltage (V) at discharge) as shown in, for example, the graph of FIG. 1. Such a discharge characteristic varies depending on a distance between a discharge part (61) and a counter part (62), the shape of the discharge parts (61), a value of insulation resistance between a discharge part (61) and a counter part (62), or the like. If error in a distance between an electrode part pair (61, 62) or in the shape of a discharge part (61) would be involved, for example, at manufacturing the discharge device, or a value of the insulation resistance between an electrode part pair (61, 62) would change due to adhesion of dust to the surface of a discharge part (61) or a counter part (62) in long-term use of the discharge device, the discharge characteristics of the electrode part pairs (61, 62) are dispersed as indicated by C1 to C4 in FIG. 1.

For example, when voltage indicated at Va in FIG. 1 is applied to both the electrode parts (61, 62) by the power source means (45), the above described dispersion of the discharge characteristics increases a current flowing in one discharge part (61) (a discharge part S having a characteristic indicated at C1 in FIG. 1). When the current value thereof reaches, for example, a spark occurring region indicated by hatching in FIG. 1, the streamer discharge is not performed at the discharge part (61), causing a spark towards the corresponding counter part (62) of the counter electrode (42).

When such a spark occurs in one S of the discharge parts as shown in FIG. 2(A) (schematic circuit diagram of a discharge device), charge staying each discharge part (61) by the power source means (45) flows to and concentrates on the discharge part S. As a result, the amount of sparks increases, increasing noise accompanied by the spark occurrence.

In the first invention, the resistor (60) is provided in the current carrying path between the power source means (45) and the discharge parts (61) of the discharge electrode (41).

This reduces voltage to be applied to the discharge parts (61) (Vb in FIG. 1, for example). As a result, the current value in the streamer discharge can be reduced, suppressing spark occurrence.

Even if, for example, a spark would occur at one S of the discharge parts, the resistor (60) would restrain the charge of the other discharge parts (60) from flowing to the discharge part S (FIG. 2(B), for example). Thus, the amount of sparks is reduced.

Referring to a second invention, in the discharge device of the first invention, the resistor (60) is made of a conductive resin material, and the resin material melts at a temperature lower than an ignition temperature thereof.

In the second invention, the resistor (60) made of a conductive resin material is provided in the current carrying path between the power source means (45) and the discharge parts (61). In this invention, also, the spark occurrence can be suppressed by the operation and the effects described in the first invention, minimizing the amount of sparks.

Further, in the second invention, a resin material that melts at a temperature lower than the ignition temperature thereof is used as the resistor (60), so that short circuit between an electrode part pair (61, 62) in the discharge device can be eliminated and firing and fuming of the resistor (60) can be suppressed.

Specifically, for example, in the discharge device provided with the resistor (60) as shown in FIG. 2(B), if a discharge part S would be in contact with the corresponding counter part for some reason (deformation of an electrode caused due to long term use of the discharge device, for example), short circuit would be caused between the electrode part pair (61, 62) (the state shown in FIG. 2C, for example). When the short circuit is caused, the charge staying in each discharge part (61) flows to and concentrates on the short-circuited electrode part pair (61, 62), so that the predetermined streamer discharge cannot be performed between the electrode part pair (61, 62).

In contrast, in the this invention, when the short circuit is caused between a electrode part pair (61, 62) including the discharge part S, the temperature of the resistor (60) rises by the current flowing in the resistor (60) provided immediately before the discharge part S. When the temperature rise in the resistor (60) melts the resistor (60), the electrode part pair (61, 62) is insulated from each other, eliminating the short circuit (FIG. 2(D), for example).

The resistor (60) is made of a resin material that melts at a temperature lower than the ignition temperature thereof, so that fusing and firing of the resistor (60), which would be accompanied by temperature rise in the resistor (60), can be prevented.

Referring to a third invention, in the discharge device of the first invention, the resistor (60) is made of an electrically diffusible material. Herein, "the electrically diffusible material" means a material (anti-static material) having a "dissipative" property and standardized in EIA (Electronic Industries Association) in the US, and materials having a volume resistivity within the range between $10^{15}$ and $10^{12}$ Ω·cm are suitable as the material.

In the third invention, the resistor (60) made of an electrically diffusible material is provided in the current carrying path between the power source means (45) and the discharge parts (61). In this invention, also, spark occurrence can be suppressed by the operation and the effects described in the first invention, minimizing the amount of sparks.

Particularly, because the electrically diffusible material has a high volume resistivity, compared with that of the conducive material, the current flowing in the current carrying path can be further reduced. Accordingly, the spark occurrence can be suppressed effectively.

As described as to the second invention, in comparison with, for example, the case with the conductive resin, the value or the density of the current flowing in the resistor (60) is reduced when the current flows to and concentrates on the resistor (60) because of short circuit between an electrode part pair (61, 62). Therefore, temperature rise in the resistor (60) at short circuit between an electrode part pair (61, 62) can be suppressed. This prevents fusing and ignition of the resistor (60) reliably.

Referring to a fourth invention, in the discharge device of any one of the first to third inventions, the discharge electrode (41) includes a discharge side support member (43) for supporting the plurality of discharge parts (61), and the discharge side support member (43) is composed of the resistor (60).

In the fourth invention, the discharge side support member (43) for supporting the plurality of discharge parts (61) is provided in the current carrying path between the power source means (45) and the discharge parts (61) and functions as the resistor (60). This suppresses the spark occurrence and reduces the amount of sparks.

Further, in the case where the discharge side support member (43) is made of a resin material that melts at a temperature lower than the ignition temperature thereof, when the short circuit is caused between an electrode part pair (61, 62), the discharge side support member (43) melts before ignition, eliminating the short circuit.

Referring to a fifth invention, in the discharge device of the fourth invention, the discharge electrode (41) includes the plurality of discharge parts (61) and a plurality of discharge side support members (43) for supporting the discharge parts (61).

In the fifth invention, the plurality of discharge side support members (43) are provided correspondingly to the plurality of discharge parts (61) in the current carrying path between the power source means (45) and the discharge parts (61) and each function as the resistor (60). Accordingly, the spark occurrence can be suppressed in every electrode part pair (61, 62) reliably, and the amount of sparks can be reduced in every electrode part pair (61, 62).

Referring to a sixth invention, in the discharge device of the sixth invention, the plurality of discharge parts (61) are held by a discharge side support member (43), the discharge side support member (43) is provided with a resin material (44) that melts at a temperature lower than an ignition temperature thereof, a conductive part (50) for allowing the discharge parts (61) to be conductive with the power source means (45) is formed in the resin material (44), and the resistor (60) is provided at the conductive part (50).

In the sixth invention, the conductive part (50) is provided at the discharge side support member (43) in the current carrying path between the power source means (45) and the discharge parts (61), and at least a part of the conductive part (50) functions as the resistor (60). Accordingly, the spark occurrence can be suppressed by the operation and the effects described in the first invention, minimizing the amount of sparks.

Further, when the temperature of the conductive part (50) as the resistor (60) rises upon, for example, short circuit between an electrode part pair (61, 62), the resin material (44) of the discharge side support member (43) where the conductive part (50) is formed melts. The melted resin material (44) cuts the conductive part (50) formed at the resin material (44) and insulates the electrode part pair (61, 62) from each other. Thus, the short circuit is eliminated.

In addition, the discharge side support member (43) is made of the resin material (44) that melts at a temperature lower than the ignition temperature thereof, suppressing ignition and fuming of the resin material (44) until the short circuit is eliminated.

A seventh invention presumes a discharge device, which includes a discharge electrode (41) including a plurality of discharge parts (61) and a counter electrode (42) including a plurality of counter parts (62) confronting the discharge parts (61), for performing streamer discharge by applying voltage to both the electrodes (41, 42) by power source means (45). Wherein the discharge device is characterized in that a resistor (60) is provided in a current carrying path between the power source means (45) and the counter parts (62). Wherein, the current carrying path herein includes the counter parts (62), and the resistor (60) may be provided at the counter parts (62).

In the seventh invention, in contrast to the first invention, the resistor (60) is provided in the current carrying path between the power source means (45) and the counter parts (62) of the counter electrode (42). In this case, also, voltage applied to the discharge parts (61) can be reduced by the resistor (60), suppressing the spark occurrence.

Further, even if a spark would occur at one of the discharge parts, the resistor (60) prevents the charge staying in the other discharger parts from flowing to and concentration on the discharge part in question. Hence, the amount of sparks is minimized.

Referring to an eighth invention, in the discharge device of the seventh invention, the resistor (60) is made of a conductive resin material, and the resin material melts at a temperature lower than an ignition temperature thereof.

In the eighth invention, the resistor (60) made of a conductive resin material is provided in the current carrying path between the power source means (45) and the counter parts (62). Accordingly, the spark occurrence can be suppressed, and the amount of sparks can be minimized.

Further, the resistor (60) is made of a resin material that melts at a temperature lower than the ignition temperature thereof, so that the resistor (60) melts upon short circuit between an electrode part pair (61, 62) before ignition and fuming thereof. Thus, the short circuit between the electrode part pair (61, 62) can be eliminated with no ignition and fuming of the resistor (60) caused.

Referring to a ninth invention, in the discharge device of the seventh invention, the resistor (60) is made of an electrically diffusible material.

In the ninth invention, the resistor (60) made of an electrically diffusible material is provided in the current carrying path between the power source means (45) and the counter parts (62). Hence, the spark occurrence can be suppressed effectively, and the amount of sparks can be minimized.

Further, temperature rise in the resistor (60) upon short circuit between an electrode part pair (61, 62) can be suppressed, thereby avoiding ignition and fuming of the resistor (60).

Referring to a tenth invention, in the discharge device of any one of the seventh to ninth inventions, the counter electrode (42) includes a counter side support member (63) for supporting the plurality of counter parts (62), and the counter side support member (63) is composed of the resistor (60).

In the tenth invention, the counter side support member (63) including the plurality of counter parts (62) is provided in the current carrying path between the power source means (45) and the counter parts (62) and functions as the resistor (60). Hence, the spark occurrence can be suppressed, and the amount of sparks can be reduced.

Further, in the case where the counter side support member (63) is made of a resin material that melts at a temperature lower than the ignition temperature thereof, when short circuit is caused between an electrode part pair (61, 62), the counter side support member (63) melts to eliminate the short circuit.

Referring to an eleventh invention, in the discharge device of the tenth invention, the counter electrode (42) includes the plurality of counter parts (62) and a plurality of counter side support members (63) for supporting the counter parts (62).

In the eleventh invention, the plurality of counter side support members (63) are provide correspondingly to the counter parts (62) in the current carrying path between the power source means (45) and the counter parts (62) and each function as the resistor (60). Accordingly, the spark occurrence can be suppressed reliably and the amount of sparks can be reduced in every electrode part pair (61, 62).

Referring to a twelfth invention, in the discharge device of the seventh invention, the counter electrode (42) is provided with a resin material (44) that melts at a temperature lower than an ignition temperature thereof, a conductive part (50) for allowing the counter parts (62) to be conductive with the power source means (45) is formed at the resin material (44), and the resistor (60) is provided at the conductive part (50).

In the twelfth invention, the conductive part (50) is provided at the counter electrode (42) in the current carrying path between the power source means (45) and the counter parts (62), and at least a part of the conductive part (50) functions as the resistor (60). Accordingly, the spark occurrence can be suppressed, and the amount of sparks can be reduced.

Further, when the temperature of the conductive part (50) as the resistor (60) rises upon, for example, short circuit between an electrode part pair (61, 62), the resin material (44) of the counter electrode (42) melts. The melted resin material (44) disperses the conduction part (50) formed at the resin material (44) to insulate the electrode part pair (61, 62) from each other. Thus, the short circuit is eliminated.

A thirteenth invention presumes an air purifier, which includes a discharge device for performing streamer discharge between a discharge electrode (41) and a counter electrode (42), for performing air purification of to-be-treated air by allowing the to-be-treated air to flow between the electrodes (41, 42). Wherein, the discharge device of the air purifier is the discharge device.

In the thirteenth invention, the discharge device of any one of the first to twelfth inventions is applied to an air purifier. Hence, the spark occurrence can be suppressed and the amount of sparks can be reduced in the air purifier.

EFFECTS

In the first invention, the resistor (60) is provided in the current carrying path between the power source means (45) and the discharge parts (61), so that the spark occurrence is suppressed in the discharge device. Hence, the streamer discharge can be performed stably.

The suppression of the spark occurrence suppresses noise generated at spark. Further, deficiency of electronic appliances in the vicinity of the discharge device can be suppressed, which is caused due to electromagnetic waves generated in association with the spark occurrence.

Further, the resistor (60) minimizes the amount of sparks even if a spark would occur between one pair of a discharge part (61) and a counter part (62). Hence, reduction in noise or reduction in electromagnetic wave, which are generated in association with the spark occurrence, can be attained. trode part pair (61, 62) can be eliminated reliably, resulting in enhancement of the safety of the air purifier.

In the second invention, the resistor (60), which is made of a resin material that melts at a temperature lower than the ignition temperature thereof, is provided in the current carrying path between the power source means (45) and the discharge parts (61). Accordingly, when short circuit is caused between an electrode part pair (61, 62), the resistor (60) melts, thereby eliminating the short circuit. Since the resistor (60) melts at a temperature lower than the ignition temperature thereof, firing and fuming of the resistor (60) can be suppressed. Hence, the safety and the reliability of the discharge device can be enhanced.

In the third invention, the resistor (60), which is made of an electrically diffusible material, is provided in the current carrying path between the power source means (45) and the discharge parts (61). Accordingly, the spark occurrence or generation of noise and electromagnetic waves, which are accompanied by the spark occurrence, can be suppressed effectively.

Further, according to this invention, temperature rise of the resistor (60) upon short circuit between an electrode part pair (61, 62) can be suppressed effectively. Accordingly, ignition and fuming of the resistor (60) can be prevented, contemplating enhancement of the safety and the reliability of the discharge device.

In the fourth invention, the discharge side support member (43) for supporting the discharge parts (61) serves as the resistor (60) to reduce the frequency of the spark occurrence and the amount of sparks. Integral formation of the discharge side support member (43) with the resistor (60) leads to compact design of the discharge device.

In the fifth invention, each of the plurality of discharge side support members (43) for correspondingly supporting the plurality of discharge parts (61) serve as the resistor (60). This suppresses the spark occurrence reliably in all the electrode part pairs (61, 62) and reduces the amount of sparks. As a result, noise in the discharge device and deficiency of peripheral appliances which is caused due to electromagnetic waves can be suppressed reliably. Further, the suppression of the spark occurrence in all the electrode part pairs (61, 62) contemplates an increase in stability of the streamer discharge.

In the sixth invention, the resin material (44) of the discharge side support member (43) melts upon short circuit between an electrode part pair (61, 62) to insulate the electrode part pair (61, 62) from each other. Thus, only melting of the resin material (44) formed in the vicinity of the conductive part (50) eliminates the short circuit between the electrode part pair (61, 62) reliably.

In the seventh invention, the resistor (60) is provided in the current carrying path between the power source means (45) and the counter parts (62) to suppress the spark occurrence in the discharge device. As a result, noise accompanied by the spark occurrence can be suppressed. Further, electromagnetic waves, which are generated in association with the spark occurrence, are prevented from being generated, resulting in prevention of deficiency of electronic appliances in the vicinity of the discharge device.

Even if a spark would occur between one pair of a discharge part (61) and a counter part (62), the resistor (60) would reduce the amount of sparks. Thus, reduction in noise or electromagnetic waves, which are accompanied by the spark occurrence, can be attained.

As described above, this invention reduces the frequency of the spark occurrence and the amount of sparks, attaining stable streamer discharge of the discharge device.

In the eighth invention, the resistor (60), which is made of a resin material that melts at a temperature lower than the ignition temperature thereof, is provided in the current carrying path between the power source means (45) and the discharge parts (62). Accordingly, when short circuit is caused between an electrode part pair (61, 62), the resistor (60) melts to eliminate the short circuit. Since the resistor (60) melts at a temperature lower than the ignition temperature thereof, firing and fuming of the resistor (60) can be suppressed. Hence, the safety and the reliability of the discharge device can be enhanced.

In the ninth invention, the resistor (60), which is made of an electrically diffusible material, is provided in the current carrying path between the power source means (45) and the counter parts (62). Accordingly, the spark occurrence or generation of noise and electromagnetic waves, which are accompanied by the spark occurrence, can be suppressed effectively.

Further, temperature rise of the resistor (60) upon short circuit between an electrodes part pair (61, 62) can be suppressed effectively. Accordingly, ignition and fuming of the resistor (60) can be prevented, contemplating enhancement of the safety and the reliability of the discharge device.

In the tenth invention, the counter side support member (63) for supporting the counter parts (62) serves as the resistor (60) to reduce the frequency of the spark occurrence and the amount of sparks. Integral formation of the discharge side support member (63) with the resistor (60) leads to compact design of the discharge device.

In the eleventh invention, each of the plurality of counter side support members (63) for correspondingly supporting the plurality of counter part parts (62) serve as the resistor (60). This suppresses the spark occurrence reliably in all the electrode part pairs (61, 62) and reduces the amount of sparks. As a result, noise in the discharge device and deficiency of peripheral appliances which is caused due to electromagnetic waves can be suppressed reliably. Further, the suppression of the spark occurrence in all the electrode part pairs (61, 62) contemplates an increase in stability of the streamer discharge.

In the twelfth invention, the resin material (44) of the counter side support member (42) melts upon short circuit between an electrode part pair (61, 62) to insulate the electrode part pair (61, 62) from each other. Thus, only melting of the resin material (44) formed in the vicinity of the conductive part (50) eliminates the short circuit between the electrode part pair (61, 62) reliably.

In the thirteenth invention, application of the discharge device of any one of the first to twelfth inventions to an air purifier reduces the frequency of the spark occurrence and the amount of sparks. This reduces discharge noise accompanied by the spark occurrence and, and in turn, reduces noise in the air purifier.

Further, electromagnetic waves accompanied by the spark occurrence can be reduced, and malfunction of electronic appliances in the vicinity of the discharge device, which is caused due to electromagnetic waves, can be suppressed. Hence, the reliability of the discharge device can be increased.

Moreover, reduction in spark occurrence attains stable streamer discharge, contemplating an increase in air purifying efficiency of the air purifier.

In addition, in the case where the resistor (60) is made of a resin material that melts at a temperature lower than the ignition temperature thereof, short circuit between an elec

BEST MODE FOR CARRYING OUT THE INVENTION

Embodiments of the present invention will be described below in detail with reference to the drawings.

Embodiment 1 of the Invention

First, Embodiment 1 will be described with reference to FIG. 3 and FIG. 4.

Figure 3:
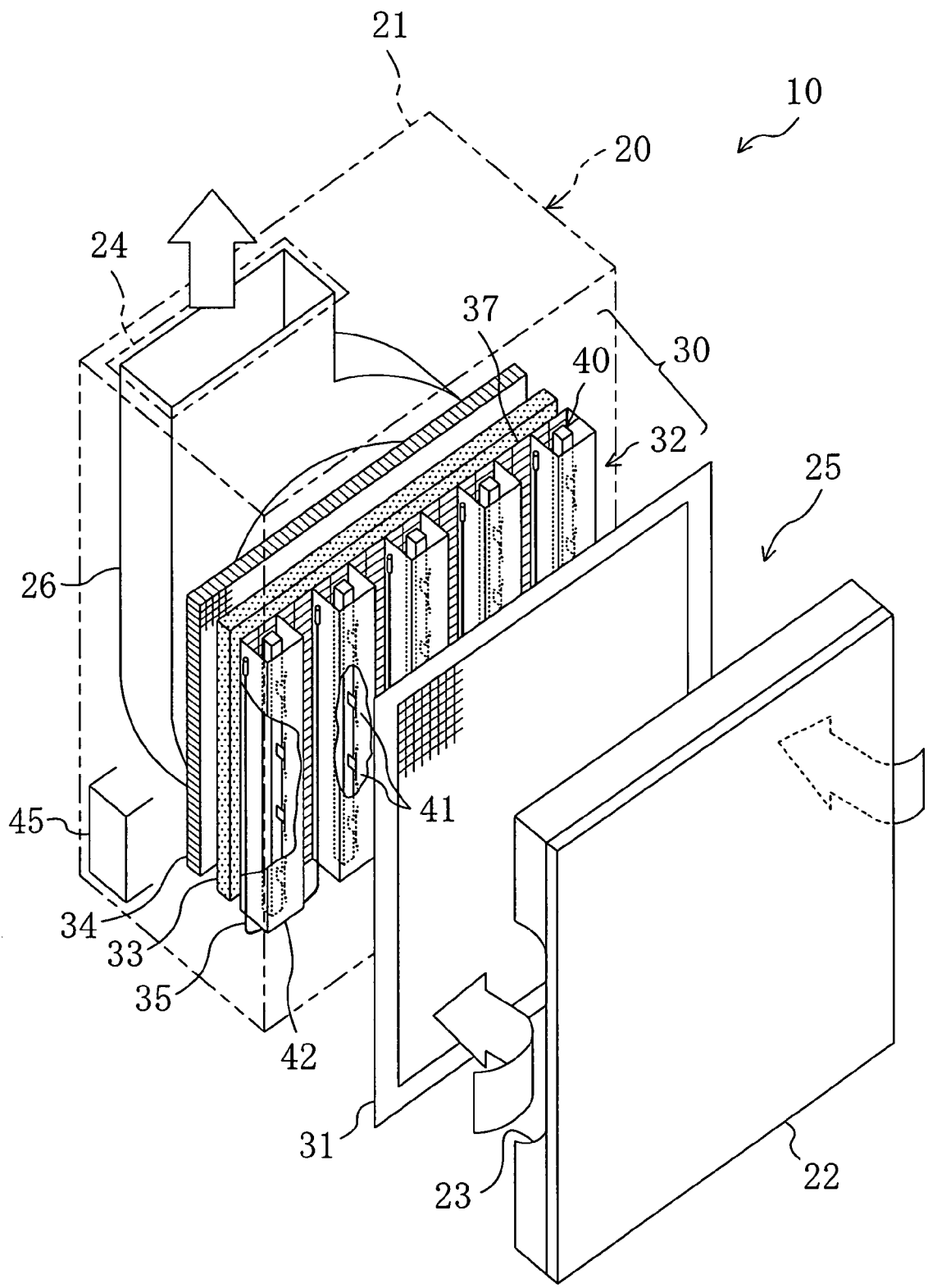
FIG. 3 is a schematic perspective view showing a whole construction of an air purifier according to Embodiment 1.

FIG. 3 is a perspective exploded view of an air purifier (10) of Embodiment 1. The air purifier (10) is a consumer air purifier for use at general home, in small stores, or the like. The air purifier (10) is an air purifier that generates low temperature plasma by streamer discharge for purifying to-be-treated air.

The air purifier (10) includes a casing (20) having a box-shaped casing body (21) of which one side is open and a front plate (22) fitted to the open side. Suction ports (air inlets) (23) are formed in both sides of the front plate (22) of the casing (20). A blowing port (an air outlet) (24) is formed in a part of the top plate near the back plate of the casing body (21).

In the casing (20), an air passage (25) through which the room air as to-be-treated air flows is formed between the air suction ports (23) to the air blowing port (24). In the air passage (25), various kinds of function components (30) for performing air purification and a centrifugal blower (26) for allowing the room air to flow in the air passage (25) are provided in this order from the upstream side in the flow of the to-be-treated air.

The function components (30) include a prefilter (31), an ionization section (32), an electrostatic filter (33), and catalyst filter (34) in this order from the front plate (22) side. The ionization section (32) incorporates integrally a discharge device (40) for generating low temperature plasma. Power source means (45) for the discharge device (40) is provided at a lower rear part of the casing body (21) of the air purifier (10).

The prefilter (31) is a filter for pretreatment for collecting comparatively large dust included in the air.

The ionization section (32) electrifies comparatively small dust that has passed through the prefilter (31) so as to make the electrostatic filter (33) disposed on the downstream side of the ionization section (32) to collect the dust. The ionization section (32) includes a plurality of ionization lines (35) and a plurality of counter electrodes (42). The plurality of ionization lines (35) extend from the top end to the bottom end of the ionization section (32) so as to be arranged at regular intervals on one virtual plane parallel to the electrostatic filter (33). Each counter electrode (42) is formed of a long member in a squared C-shape in horizontal section and the open side thereof faces rearwards. The counter electrodes (42) are arranged between and in parallel to the ionization lines (35). The open sides of the counter electrodes (42) are joined to one meshed plate (37).

Figure 4:
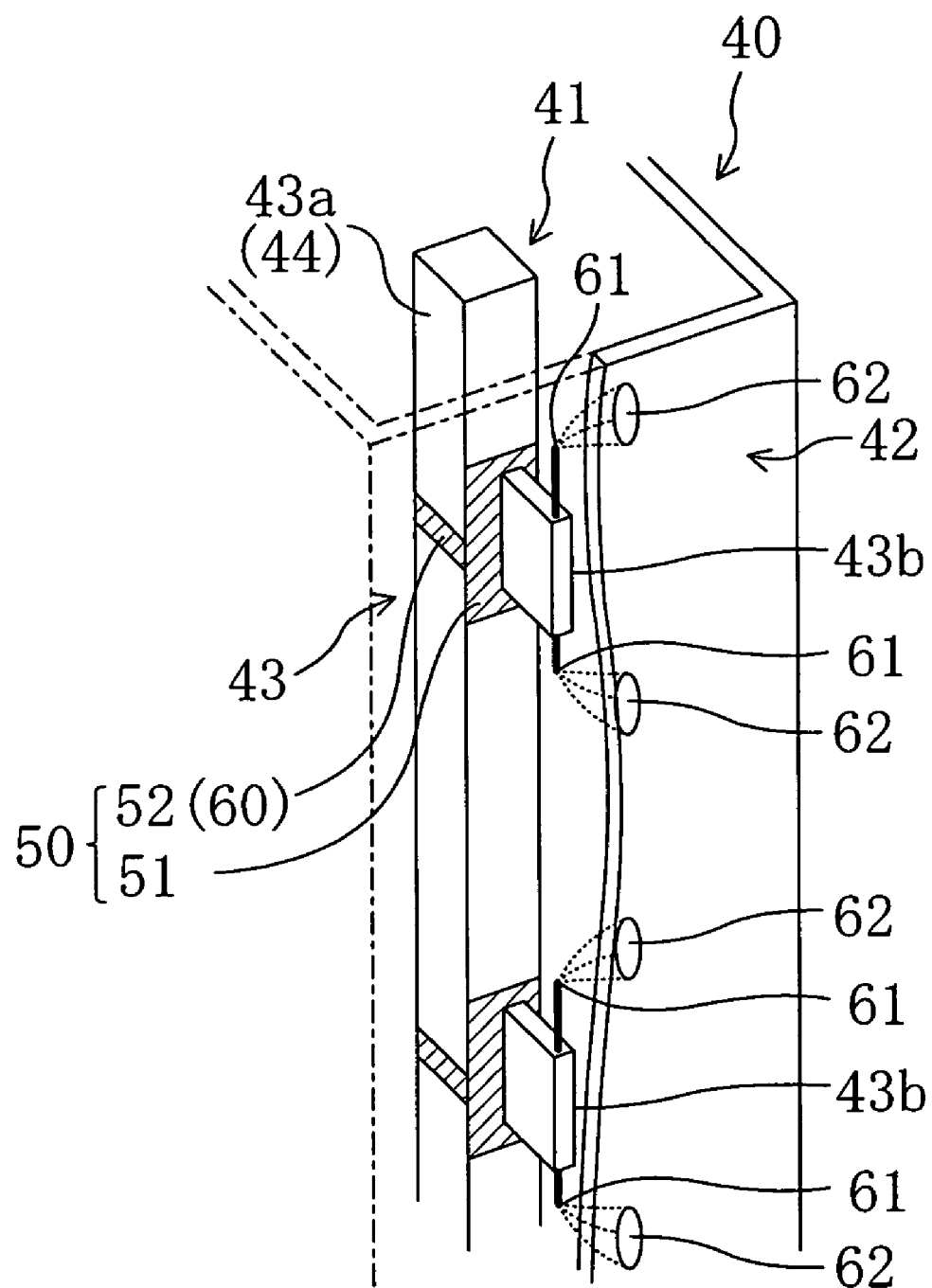
FIG. 4 is an enlarged perspective view of a major part of a discharge device according to Embodiment 1.

The discharge device (40) includes, as shown in FIG. 4 as a partial enlarged perspective view of FIG. 3, discharge electrodes (41) each having a plurality of discharge parts (61) and the counter electrodes (42). Counter parts (62) of the respective counter electrodes (42) confront the discharge parts (61) of the respective discharge electrodes (41). The counter electrodes (42) serve as the counter electrodes (42) of the ionization section (32), and the discharge electrodes (41) are disposed correspondingly within the counter electrodes (42) confronting the discharge electrodes (41).

Each discharge electrode (41) includes the discharge parts (61), which serves as base points of the streamer discharge, and a discharge side support member (43) for holding the discharge parts (41). The discharge side support member (43) includes a prismatic rectangular member (43a) extending in the vertical direction and flat plate members (43b) held to the rectangular member (43a) at a predetermined interval left therebetween. A rod-like or linear discharge needle (discharge part) (61) is supported to each of the upper and lower faces of each flat plate member (43b). The discharge needle (61) is arranged so as to be substantially in parallel to the front face of the corresponding counter electrode (42).

The rectangular member (43a) is made of an insulating resin material (44) of polypropylene. The resin material (44) has a property of melting at a temperature lower than the ignition temperature thereof. The flat plate members (43b) are made of a conductive metal material.

In the resin-made rectangular member (43a), printing conductive parts (conductive parts) (50) are formed which are conductive with the power source means (45) through a current carrying path (not shown). The printing conducive parts (50) are conductive with the discharge needles (61) through the flat plate members (43b).

Specifically, each printing conductive part (50) includes a first printing conductive part (51) located at the front face of the rectangular member (43a) and a second printing conductive part (52) located at one side face of the rectangular member (43a). The first printing conductive part (51) is formed in the vicinity of a part supporting the corresponding flat plate member (43b). The first printing conductive part (51) is conductive with the corresponding discharge needles (61) through the corresponding flat plate member (43b). The second printing conductive member (52) is in contact at the front end thereof with a side edge of the corresponding first printing conductive part (51) so as to be conductive with the first printing conductive part. The rear end of the second printing conductive part (52) is in contact with the current carrying path (not shown) so as to be conductive with the power source means (45) through the current carrying path. The second printing conductive part (52) is shorter in the vertical direction than the first printing conductive part (51). The second printing conductive part (52) functions as a resistor (60) against the current flowing in the corresponding first printing conducive part (50). The resistance value of the resistor (60) is set to 5 MΩ or larger in the present embodiment.

In the discharge device (40) with the above described construction, when voltage is applied to the discharge device (40) by the power source means (45), a current flows from the power source means (45) to the second printing conductive parts (52) of the rectangular member (43a) through the given current carrying path. After flowing from the second printing conductive parts (52) to the first printing conductive parts (51), the current flows to the discharge needles (61) through the flat plate members (43b). As a result, the streamer discharge is caused from the tip ends of the discharge needles (61) towards the counter parts (62) confronting the discharge needles (61), thereby generating low temperature plasma.

The catalyst filter (34) is arranged on the downstream side of the electrostatic filter (33). The catalyst filter (34) has a base material in, for example, a honeycomb structure of which surface carries a catalyst. As the catalyst, a substance is used which activates a material having high reactivity further in the low temperature plasma generated by discharge and promotes decomposition of injurious components and odor components in the air, such as a manganese-based catalyst, a noble metal-based catalyst, or the like.

—Driving Operation—

A driving operation of the air purifier (10) in the present embodiment will be described next.

During the operation of the air purifier (10), the centrifugal blower (26) shown in FIG. 3 works so that the room air flows through the air passage (25) in the casing (20). In this state, voltage is applied to the ionization section (32) and the discharge device (40) by the power source means (45).

When the room air is introduced into the casing (20), comparatively large dust is removed by the prefilter (31) first. Then, comparatively small dust in the room air is electrified when the room air passes through the ionization section (32), and the room air flows downstream, so that the dust is collected by the electrostatic filter (33). In this way, almost all dust in the air is removed by the prefilter (31) and the electrostatic filter (32) regardless of the size (large or small).

In the discharge device (40) integrally incorporated in the ionization section (32), as shown in FIG. 4, the low temperature plasma is generated towards the counter parts (62) of the counter electrodes (42) from the tip ends of the discharge needles (61) of the discharge electrodes (41) to generate active species having high reactivity, such as electrons, ions, ozone, radicals, and the like. The active species are further activated when reaching the catalyst filter (41) to decompose and remove injurious components and odor components in the air. The thus purified room air, from which dust, the injurious components, and odor components have been removed, is blown out from the air blowing port (24) into the room.

Figure 1:
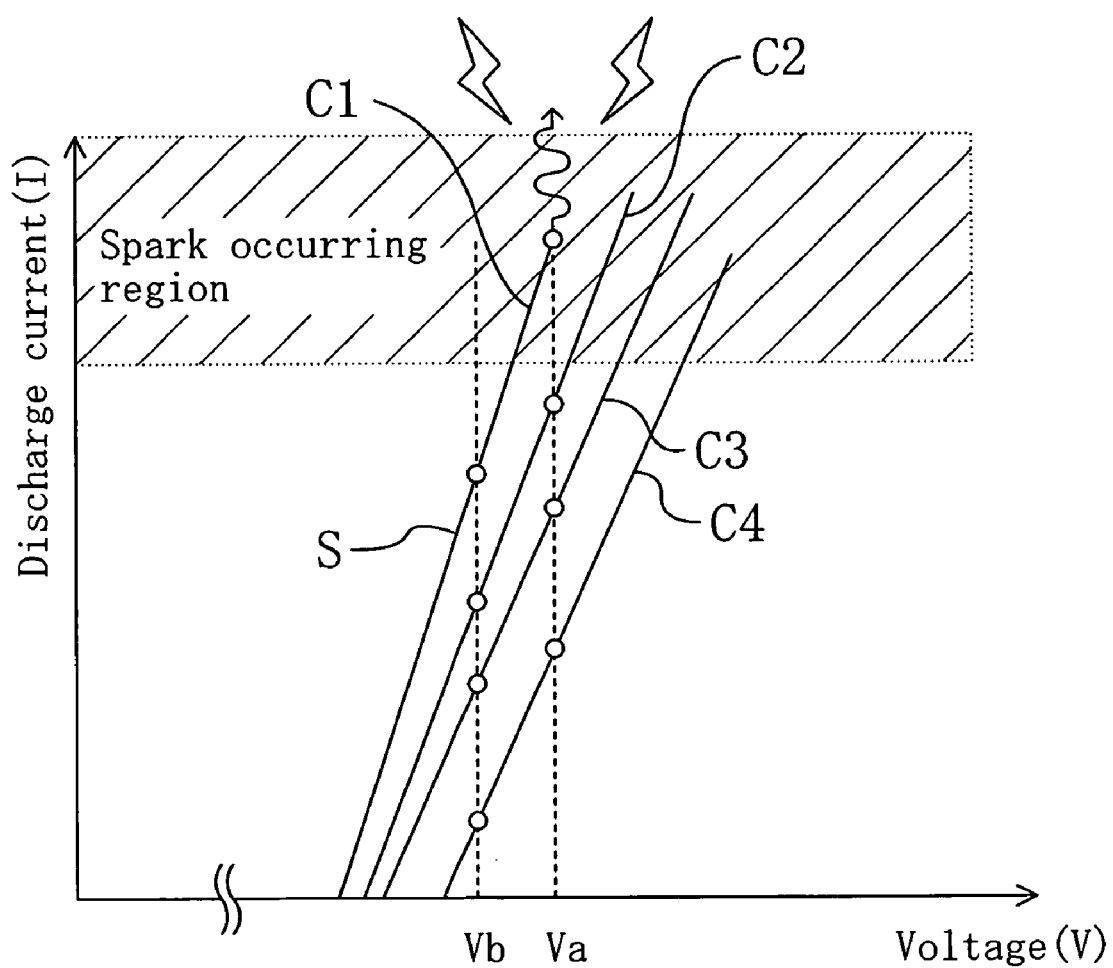
FIG. 1 is a graph showing discharge characteristics in streamer discharge in a discharge device.

In the operation of the air purifier (10), if dust would adhere to the surface of a discharge needle (61) or a counter part (62) of the discharge device (40) or error in distance between a electrode part pair (61, 62) would be caused, the discharge characteristics of the electrode part pairs (61, 62) would be dispersed. If so, the discharge current of a single discharge needle S would increase, as shown in, for example, FIG. 1, resulting in invitation of occurrence of a spark.

Under the circumstances, in the discharge device (40) of the air purifier (10) according to the present embodiment, the resistor (60) is provided for suppressing such spark occurrence.

Figure 2:
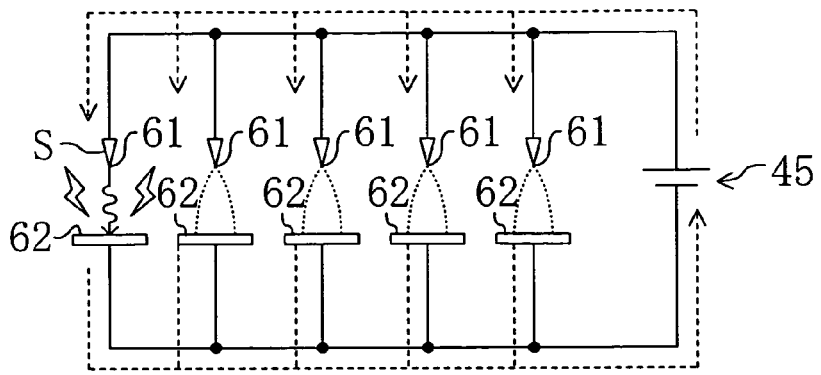
FIG. 2 presents schematic circuit diagrams showing examples of streamer discharge in a discharge device.
Figure 2:
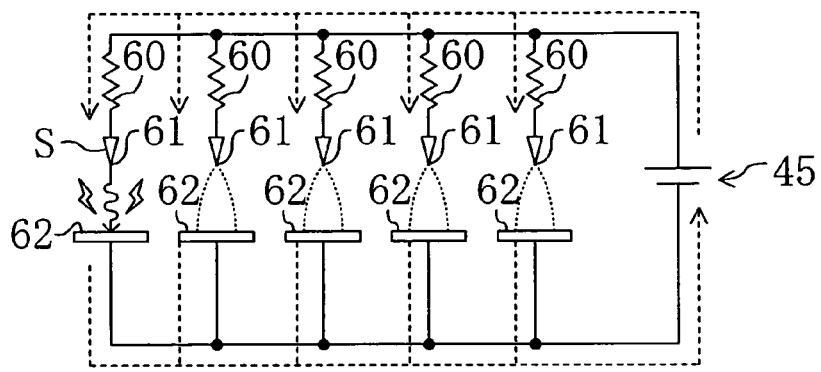
Figure 2:
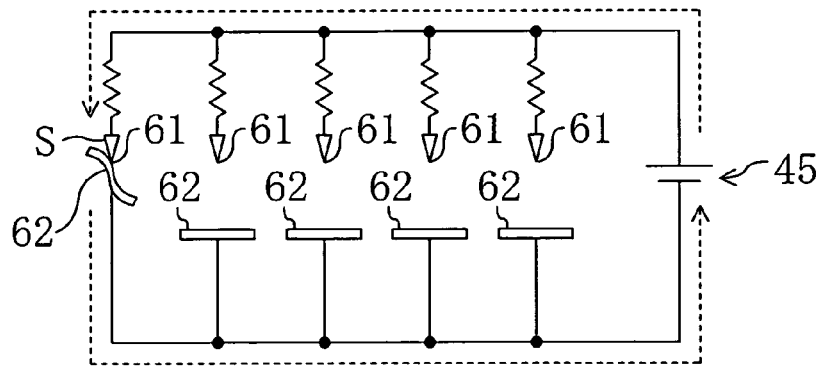
Figure 2:
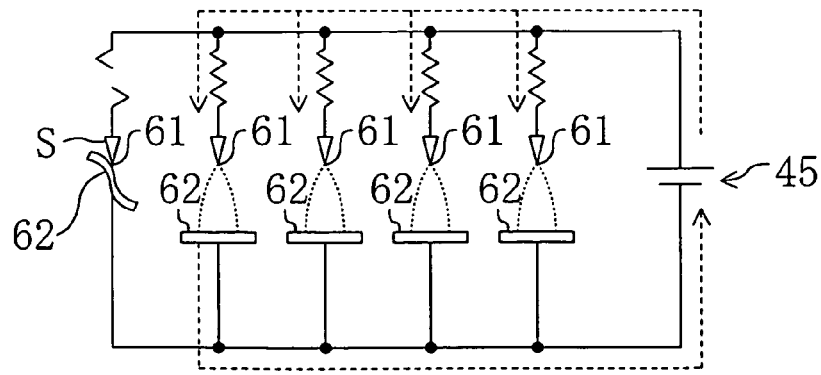

Specifically, in the discharge device (40) of Embodiment 1, the second printing conductive parts (52) functioning as the resistors (60) are provided at the discharge side support member (43) of each discharge electrode (41). Accordingly, voltage applied to each discharge needle (61) of the discharge electrodes (41) becomes smaller than that with no resistor (60), as indicated at Vb in FIG. 1, for example. As a result, even when the discharge characteristics of the plurality of discharge needles (61) are dispersed because of the aforementioned reason or the like, the value of the current flowing in a discharge needle (61) (discharge part S in FIG. 2(B), for example) becomes small, suppressing spark occurrence.

Further, if a spark would occur due to high discharge current of a single discharge needle S, for example, the corresponding resister (60) restrains charge staying in the other discharge needles from flowing to and concentrating on the discharge needle S. Thus, the amount of sparks at the spark occurrence is reduced compared with the case with no resistor (60).

Effects of Embodiment 1

The following effects can be exhibited by the air purifier (10) including the discharge device (40) according to Embodiment 1.

In Embodiment 1, the printing conductive parts (50) functioning as the resistors (60) are provided in the current carrying path between the power source means (45) and the discharge parts (61). Accordingly, even when the discharge characteristics of the electrode part pairs (61, 62) are dispersed, the resistors (60) reduce the discharge current to suppress the spark occurrence, reducing noise accompanied by such spark occurrence. Further, electromagnetic waves generated in association with such spark occurrence are prevented from affecting adversely peripheral appliances of the discharge device (40).

Further, even if a spark would occur in one pair of electrode parts (61, 62), the corresponding resistor (60) would restrain charges staying in the other discharge parts from flowing to the pair of electrode parts (61, 62), reducing the amount of sparks.

As described above, in the present embodiment, the resistors (60) suppress the spark occurrence effectively, so that the streamer discharge can be performed stably, contemplating an increase in air purifying efficiency of the air purifier (10) including the discharge device (40).

Figure 5:
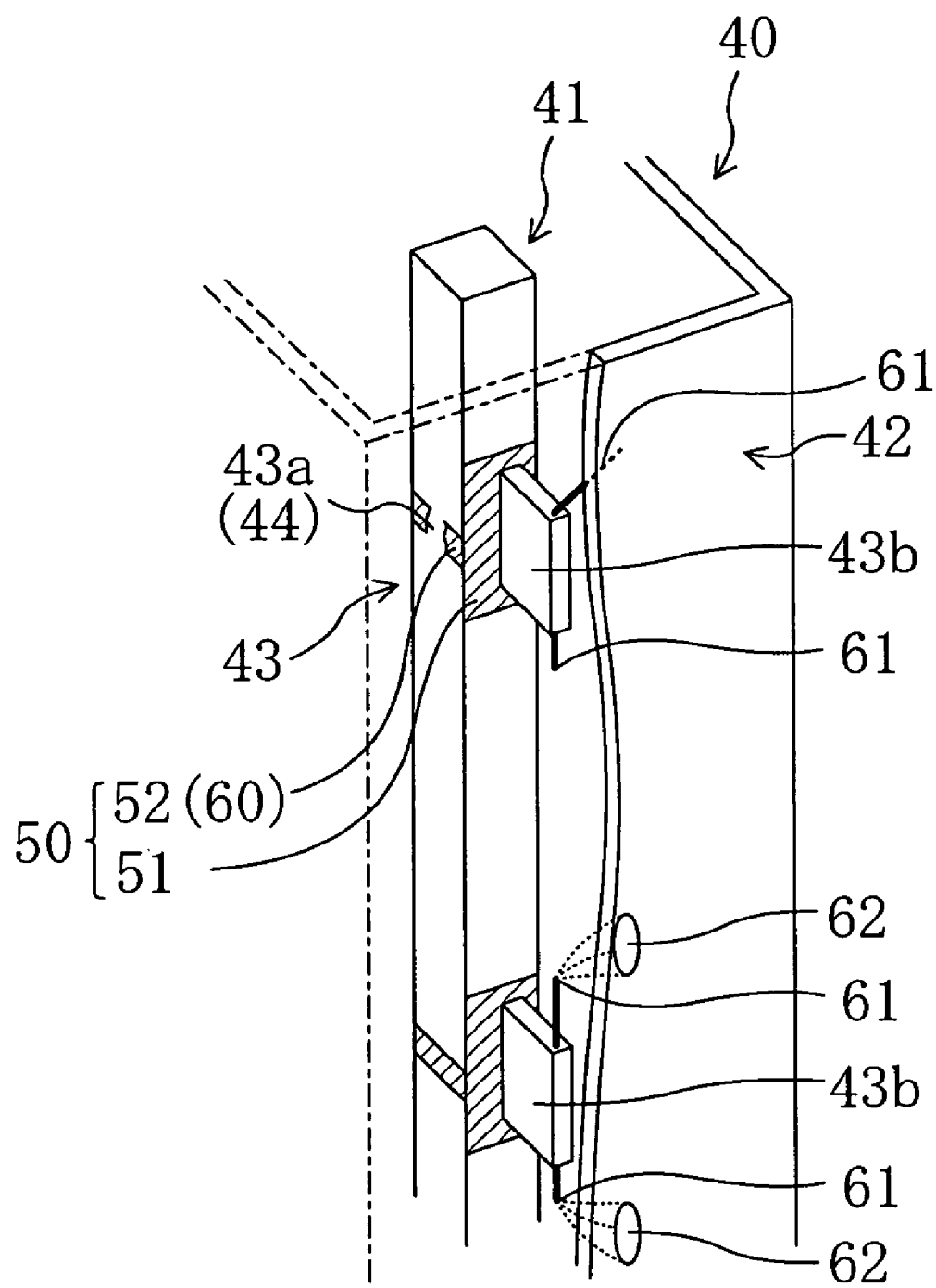
FIG. 5 is an enlarged perspective view of the major part of the discharge device according to Embodiment 1 at short circuit.

Further in Embodiment 1, as shown in FIG. 4, the rectangular members (43a) of the discharge side support members (43) are made of a resin material (44) of polypropylene. When a discharge part (61) is in contact with a counter part (62), as shown in FIG. 5, and short circuit is caused between the electrode part pair (61, 62), the temperature of the corresponding second printing conductive part (52) as the resistor (60) rises to melt the resin material (44) in the vicinity of the second printing conductive part (52). The melted resin material disperses the second printing conducive part (52), so that the discharge needle (61) is insulated from the power source means (45), eliminating the short circuit between the electrode part pair (61, 62).

The resin material (44) melts at a temperature lower than the ignition temperature thereof, and therefore, melts, before fuming or ignition, at temperature rise of the second printing conductive part (52) upon short circuit between an electrode part pair (61, 62). Hence, ignition and fuming of the resin material (44) at short circuit between the electrode part pairs (61, 62) can be prevented reliably.

Modified Example of Embodiment 1

Figure 6:
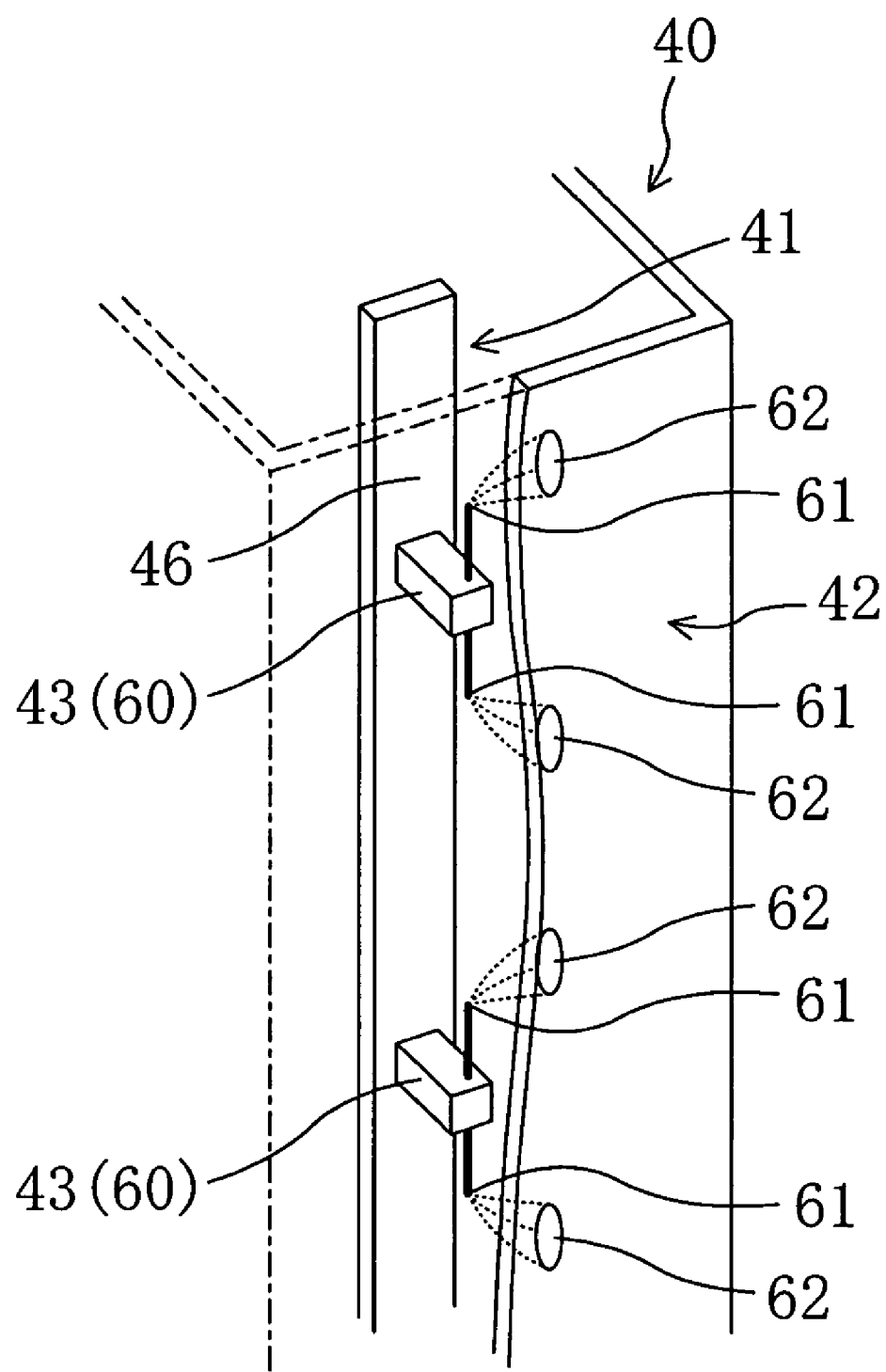
FIG. 6 is an enlarged perspective view of a major part of a discharge device according to a modified example of Embodiment 1.

Next, a modified example of the air purifier (10) according to Embodiment 1 will be described with reference to FIG. 6. In a discharge device (40) of the present modified example, discharge side support members (43) for holding discharge parts (61) of each discharge electrode (41) function as the resistor (60), and the other elements and the driving operation are the same as those in Embodiment 1.

Specifically, each discharge electrode (41) in the present modified example includes the plurality of discharge parts (61) and the plurality of discharge side support members (43) for holding the discharge parts (61). Each discharge side support member (43) is in the form of a square pole. A conductive plate (46) conductive with the power source means (45) through a current carrying path (not shown) is provided on the rear side of each discharge side support member (43). A discharge needle (discharge part) (61) similar to that in Embodiment 1 is supported to each of the upper and lower faces of each discharge side support member (43). The discharge side support members (43) are made of a conductive resin material and function as the resistors (60) against the current flowing from the conductive plate (46) to the discharge needles (61). The discharge side support members (43) have a property of melting at a temperature lower than the ignition temperature thereof.

In the above described construction, when voltage is applied to the discharge device (40) by the power source means (45), a current flows from the power source means (45) to the conductive plate (46) through the given current carrying path. After flowing into the discharge side support members (43) functioning as the resistors (60), the current flows to the discharge needles (61). As a result, the discharge needles (61) cause the streamer discharge towards the counter parts (62) confronting the discharge needles (61), generating low temperature plasma.

In the present modified example, the discharge side support members (43) for supporting the discharge needles (61) function as the resistors (60) to suppress spark occurrence between the electrode part pairs (61, 62) by the same operation and effects as those in Embodiment 1. In the present modified example, the discharge side support members (43) themselves serve as the resistor (60), reducing the number of parts to lead to compact design of the discharge device (40).

Further, the plurality of discharge side support members (43) functioning as the resistors (60) are provided correspondingly to the plurality of discharge parts (61), so that the spark occurrence can be suppressed reliably in all the electrode part pairs (61, 62).

In addition, when short circuit is caused between an electrode part pair (61, 62), the discharge side support members (43) melts to insulate the electrode part pair (61, 62) from each other, eliminating the short circuit. In the present modified example, the resistors (60) are made of a resin material that melts at a temperature lower than the ignition temperature thereof, preventing ignition and fuming of the resistors (60) at short circuit.

Embodiment 2 of the Invention

An air purifier (10) according to Embodiment 2 will be described next with reference to FIG. 7. The air purifier (10) of Embodiment 2 is different from that of Embodiment 1 in construction of the discharge device (40). Specifically, the resistors (60) are provided in the current carrying path between the power source means (45) and the discharge parts (61) of the discharge device (40) in Embodiment 1. While in a discharge device (40) in Embodiment 2, resistors (60) are provided between power source means (45) and counter parts (62).

In the discharge device (40) of Embodiment 2, each discharge electrode (41) includes discharge parts (61) serving as base points of the streamer discharge and a discharge side support member (43) for supporting the discharge parts (61). The discharge support member (43) includes a platy support member (43a) extending in the vertical direction and fixing members (43b) arranged at a predetermined interval left therebetween and held to the support member (43a). A rod-like or linear discharge needle (discharge part (61)) is supported to each of the upper and lower faces of each fixing member (43b). The discharge needles (61) are arranged substantially in parallel to the front face of counter electrodes (42). The discharge electrodes (41) are conductive with the power source means (45) through a current carrying path (not shown).

Figure 7:
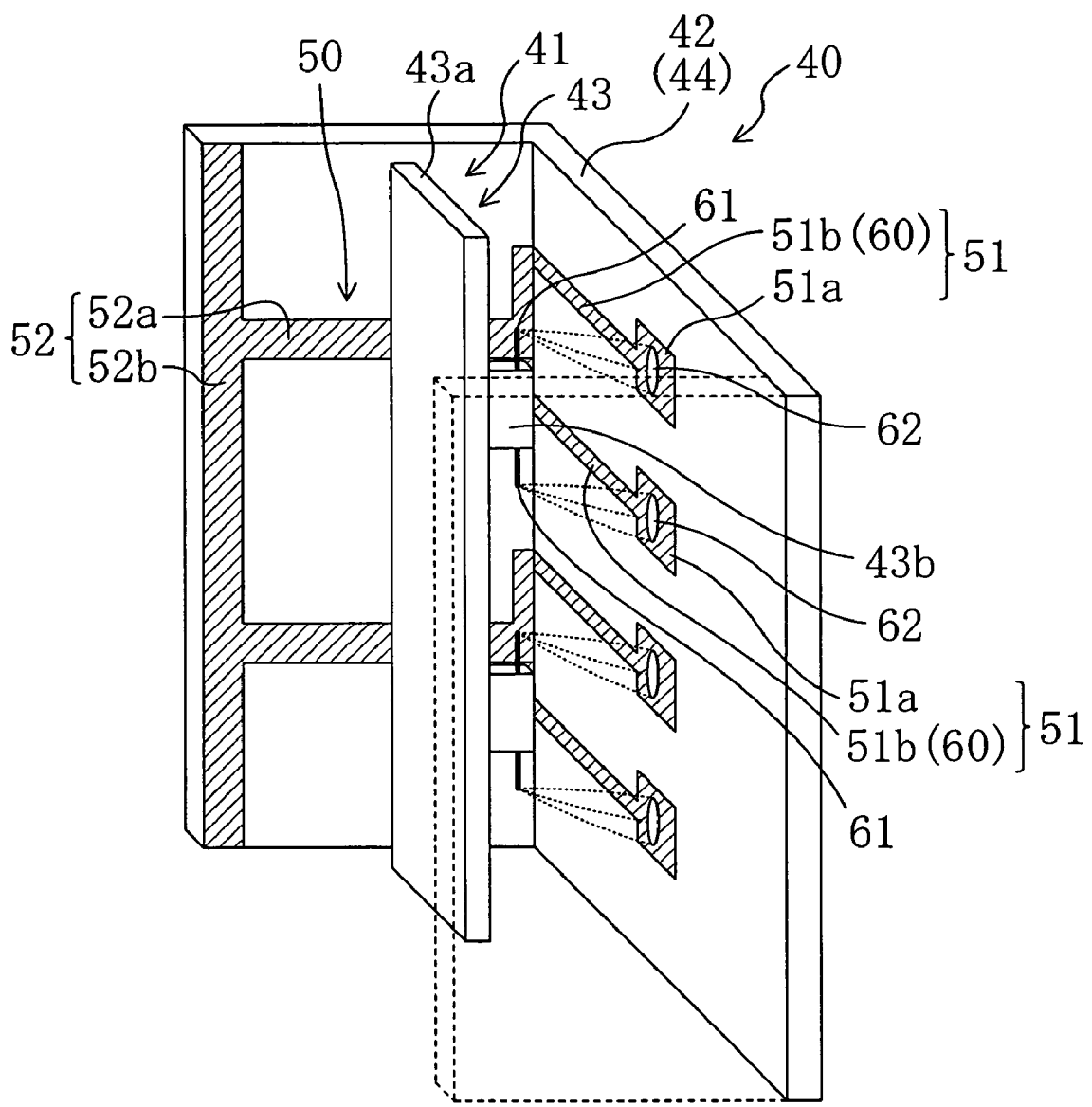
FIG. 7 is an enlarged perspective view of a major part of a discharge device according to Embodiment 2.

Similarly to Embodiment 1, each counter electrode (42) is formed of a long member in a squared C-shape in horizontal section and the open side thereof faces rearwards (on the left hand in FIG. 7). The counter electrodes (42) are made of an insulating resin material (44) of polypropylene. The resin material (44) has a property of melting at a temperature lower than the ignition temperature thereof.

A printing conductive part (conductive part) (50) is formed in each counter electrode (42) for allowing the counter parts (62) to be conductive with the power source means (45) through a current flowing path (not shown). The printing conducive part (50) includes first printing conductive parts (51) formed at the rear face of the corresponding counter electrode (42) and a second printing conductive part (52) formed at one side of the corresponding counter electrode (42).

Each first printing conductive part (51) includes a discharge printing conductive part (51a) formed in the vicinity of a counter part (62) confronting a corresponding discharge part (61) of a corresponding discharge electrode (41) and a first printing conductive path (51b) extending from the discharge printing conductive part (51a) along the side face of the corresponding counter electrode (42). The plurality of discharge printing conductive parts (51a) are provided correspondingly to the discharge parts (61). The first printing conductive paths (51b) have a width in the vertical direction smaller than the discharge printing conductive parts (51a). The first printing conductive paths (51b) function as the resistors (60) against the current following in the printing conductive part (50).

The second printing conductive part (52) includes a plurality of second printing conducive paths (52a) formed so as to be in contact with the side edges of two first printing conductive paths (51b) and a main printing conductive path (52b) to which the plurality of second printing conductive paths (52b) are joined together. The main printing conductive path (52b) is connected to the power source means (45) through the current carrying path (not shown).

In the discharge device (40) having the above described construction, when voltage is applied to the discharge device (40) by the power source means (45), a current flows to the discharge needles (61) of the discharge electrodes (41) through the given current carrying path. As a result, the streamer discharge is caused from the tip ends of the discharge needles (61) towards the counter parts (62) confronting the discharge needles (61), thereby generating low temperature plasma. The current flowing to the counter parts (62) by the streamer discharge flows to the discharge printing conductive parts (51a), the first printing conductive paths (51b), the second printing conductive paths (52a), and then, the major printing conductive path (52b) of the first printing conductive parts (51) in this order, and further flows into the power source means (45) through the current carrying path (not shown).

In the discharge device (40) of Embodiment 2, the first printing conductive paths (51b) formed at the counter electrodes (42) function as the resistors (60). Accordingly, even if dust would adhere to the surface of a discharge needle (61) or a counter part (62) or error would be cause in the distance between an electrode part pair (61, 62) to cause dispersion of the discharge characteristics between the electrode part pairs (61, 62), the discharge current in a single discharge needle S is reduced as shown in, for example, FIG. 2(B), to suppress the spark occurrence.

Even if a spark would occur due to high discharge current of a single discharge needle S, the resistor (60) formed at the corresponding counter electrode (42) prevents charges staying in the other discharge needles from flowing to and concentrating on the discharge needle S. This reduces the amount of sparks at the spark occurrence.

Moreover, in Embodiment 2, the discharge electrodes (42) are made of a resin material (44) of polypropylene. Accordingly, when a discharge part (61) is in contact with a counter part (62) and short circuit is caused between the electrode part pair (61, 62), the temperature of the corresponding first printing conductive path (51b) rises to melt the resin material (44) in the vicinity of the first printing conductive path (51b). As a result, the first printing conducive path (51b) is dispersed by the melted resin material (44) to insulate the counter part (62) from the power source means (45), eliminating the short circuit between the electrode part pair (61, 62).

The resin material (44) melts at a temperature lower than the ignition temperature thereof, and therefore, fuming and ignition of the resin material (44) are prevented in temperature rise of a first printing conductive path (51b) serving as the resistor (60) upon short circuit of an electrode part pair (61, 62).

Modified Example of Embodiment 2

Figure 8:
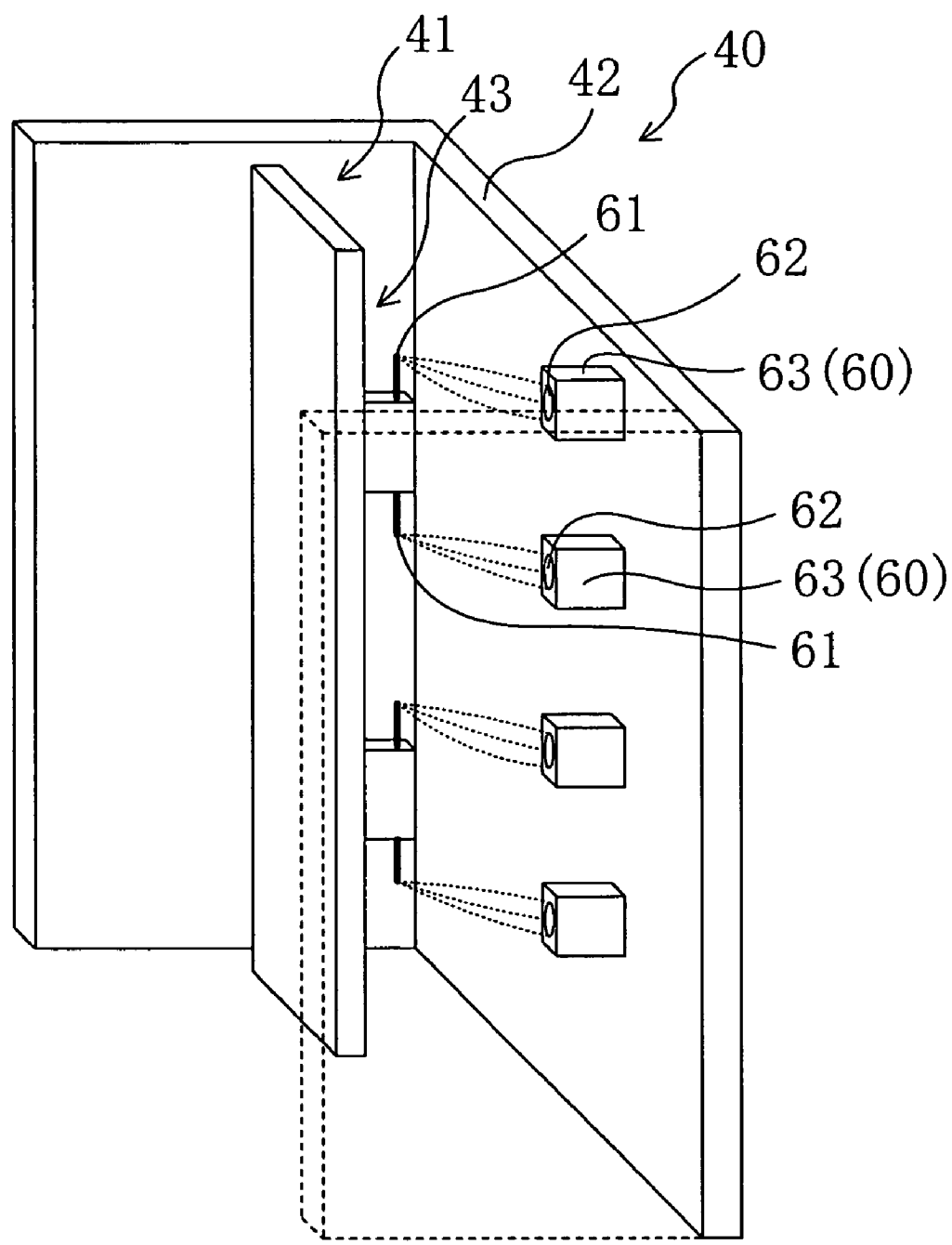
FIG. 8 is an enlarged perspective view of a major part of a discharge device according to a modified example of Embodiment 2.

A modified example of the air purifier (10) according to Embodiment 2 will be described next with reference to FIG. 8. In the present modified example, a plurality of counter side support members (63) for supporting correspondingly a plurality of counter parts (62) are provided at the rear face of each counter electrode (42). The counter side support members (63) function as the resistors (60). Each counter side support member (63) is in the form of a square pole. The counter part (62) is formed at the rear face of each counter side support member (63) so as to confront the corresponding discharge needle (discharge part) (61) of the discharge electrodes (41). The counter side support members (63) are made of a conductive resin material.

In the above described construction, when voltage is applied to the discharge device (40) by the power source means (45), a current flows from the power source means (45) to the discharge needles (61) of the discharge electrodes (41) through a predetermined current carrying path. As a result, the discharge needles (61) cause the streamer discharge towards the counter parts (62), thereby generating low temperature plasma. The current thus flowing to the counter parts (62) flows to the counter side support members (63) functioning as the resistors (60), and then, flows into the power source means (45) through the counter electrodes (42).

In the present modified example, the counter side support members (63) formed at the counter electrodes (42) function as the resistors (60) to suppress the spark occurrence between the electrode part pairs (61, 62). Further, when short circuit is caused between an electrode part pair (61, 62), the corresponding discharge side support member (63) melts in association with temperature rise, eliminating the short circuit. In the present modified example, also, the resistors (60) is made of a resin material that melts at a temperature lower than the ignition temperature thereof, so that the resistors (60) are prevented from ignition and fuming in short circuit.

Embodiment 3 of the Invention

An air purifier according to Embodiment 3 will be described next with reference to FIG. 9. The air purifier (10) of Embodiment 3 has a discharge device (40) different in construction from that of Embodiment 1.

Figure 9:
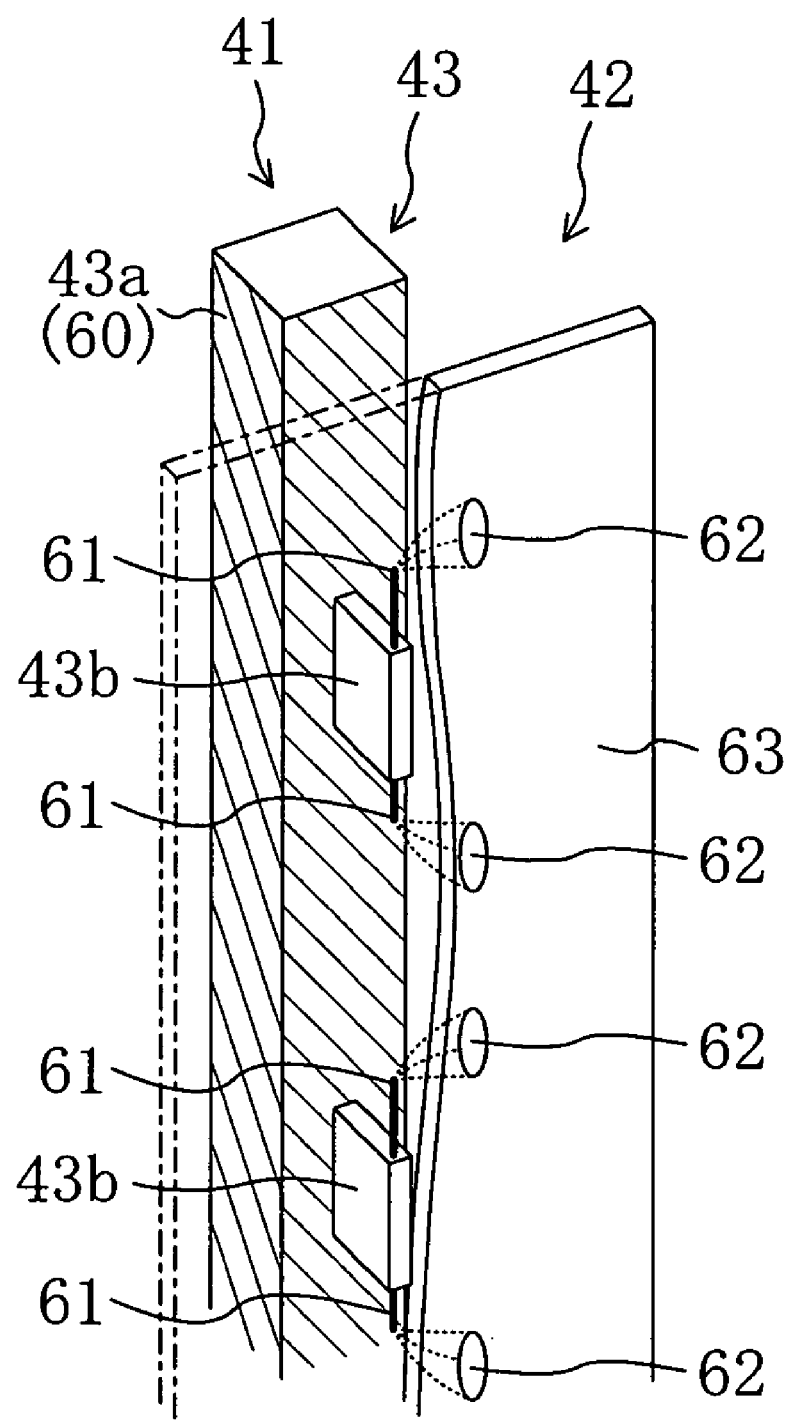
FIG. 9 is an enlarged perspective view of a major part of a discharge device according to Embodiment 3.

As shown in FIG. 9, the resistor (60) of the discharge device (40) of Embodiment 3 is made of an electrically diffusible compound material obtained by adding carbon fiber to an ABS resin (acrylonitrile-butadiene-styrene resin). The volume resistivity of the electrically diffusible material falls in the range between $10^5$ and $10^{12}$ $\Omega$cm.

In this example, the resistor (60) made of an electrically diffusible material composes a support member (43a) of a discharge side support member (43). The support member (43a) supports fixing members (43b) and discharge needles (discharge parts) (61), similarly to that in Embodiment 1. Each counter electrode (42) is formed of a platy counter side support member (63), and the counter parts (62) are formed at the face of each counter side support member (63) which confronts the discharge parts (61).

In Embodiment 3, further, arc detecting means (not shown) is provided in the power source means (45). When dust or the like adheres to, for example, a resistor (60) of an electrically diffusible material and the resistance value of the resistor (60) increases, a spark occur between a corresponding electrode part pair (61, 62). The arc detecting means detects such a spark and functions as a safety device for stopping voltage application by the power source means (45).

As described above, in Embodiment 3, the electrically diffusible material is used as the resistor (60) in the current carrying path between the power source means (45) and the discharge parts (61). The electrically diffusible material has a volume resistivity higher than the aforementioned conductive resin, and therefore, the current flowing in the discharge parts (61) can be reduced further effectively. Hence, the frequency of the spark occurrence and the amount of sparks can be reduced further effectively.

Moreover, with the resistor (60) made of an electrically diffusible material, though short circuit is caused between an electrode part pair (61, 62b) and the current flows to and concentrates on the corresponding resistor (60), the current value or the current density of the resistor (60) can be reduced compared with the case with that made of an conductive resin material. This suppresses temperature rise of the resistor (60) upon short circuit between an electrode part pair (61, 62). Hence, ignition and fuming of the resistor (60) can be prevented, contemplating enhancement of the safety and the reliability of the discharge device.

Embodiment 4 of the Invention

Figure 10:
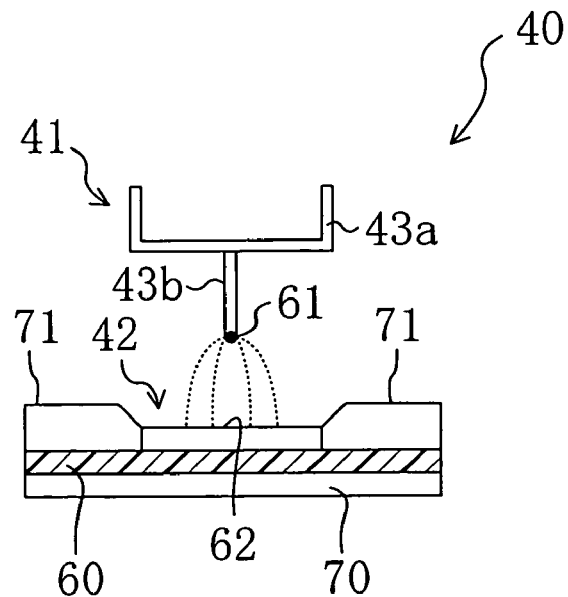
FIG. 10 is a view of a major part of a discharge device according to Embodiment 4 as viewed from above.
Figure 11:
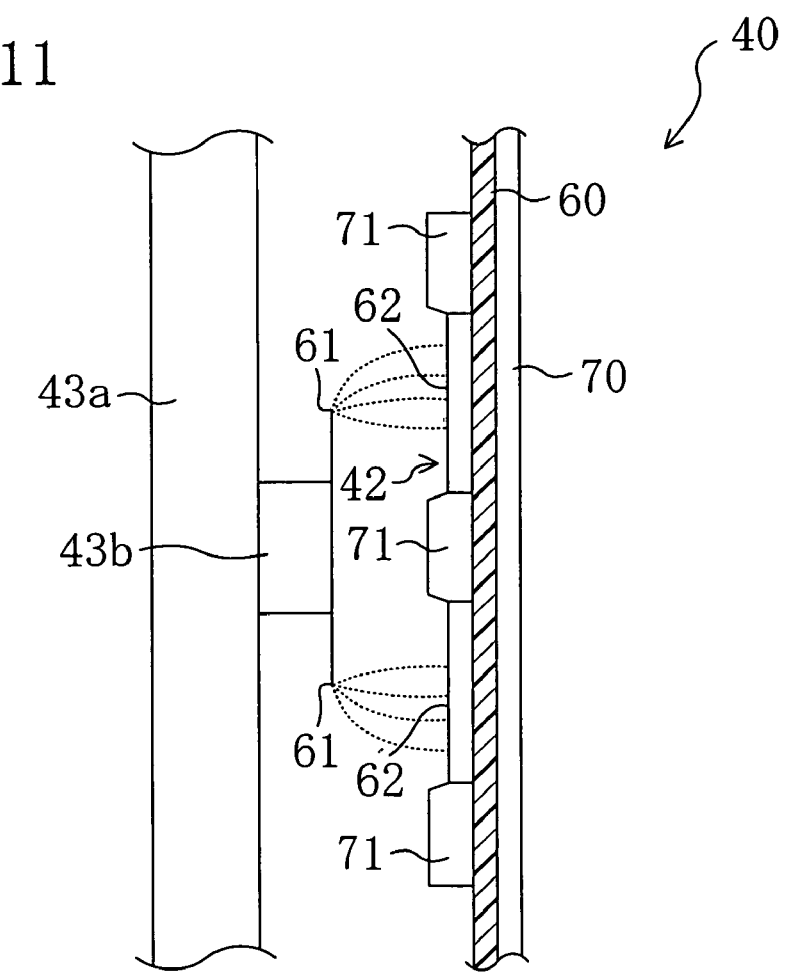
FIG. 11 is a view of the major part of the discharge device according to Embodiment 4 as viewed from one side.

An air purifier (10) according to Embodiment 4 will be described next with reference to FIG. 10 and FIG. 11. Embodiment 4 is different from the above embodiments in construction of counter electrodes (42). FIG. 10 is a view of a major part of a discharge device (40) as viewed from above and FIG. 11 is a view of the major part of the discharge device (40) as viewed from one side.

In the discharge device of Embodiment 4, counter electrodes (42) and earth electrodes (70) are provided so as to face the discharge electrodes (41). Each counter electrode (42) and each earth electrode (70) are in plate shapes. A plurality of insulating members (71) covers predetermined parts of each counter electrode (42), and a part not covered with the insulating members (71) confronts, as a counter part (62), the tip end of the corresponding discharge needle (61). The earth electrodes (70) are connected to the negative terminal of the power source means (45). A resistor (60), which is made of a conductive resin material, is provided between each counter electrode (42) and each earth electrode (70).

In the above described construction, when voltage is applied to the discharge device (40) by the power source means (45), a current flows from the power source means (45) to the discharge needles (61) of the discharge electrodes (41) through a predetermined current carrying path. As a result, the discharge needles (61) cause the streamer discharge towards the counter parts (62), thereby generating low temperature plasma. The current thus flowing to the counter parts (62) flows to the resistors (60), and then, flows into the power source means (45) through the earth electrodes (70).

In Embodiment 4, the conductive resin material disposed between each counter electrode (42) and each earth electrode (70) functions as the resistor (60) to suppress the spark occurrence between the electrode part pairs (61, 62). In Embodiment 4, the resistors (60) can be arranged compactly between the counter electrodes (42) and the earth electrodes (70), contemplating width reduction of the discharge device (40).

Other Embodiments

The present invention may have any of the following constructions in each of the above embodiments.

In the present embodiments, the resistors (60) are made of a conductive resin material so as to melt at a temperature lower than the ignition temperature thereof. However, the resistors (60) are not necessarily made of a resin material and may be made of a material which is cut at a predetermined temperature or higher for eliminating short circuit between the electrode part pairs (61, 62), such as a metal fuse.

In the present embodiments, the resin material (44) at which the printing conductive parts (50) are formed is made of polypropylene. However, the resin material (44) may be any insulating material that melts at a temperature lower than the ignition temperature thereof, such as an olefin-based resin material.

In the discharge devices (40) of the present embodiments, as shown in FIG. 5, for example, the printing conductive parts (50) are formed at the resin material (44). When short circuit is caused between an electrode part pair (61, 62), the resin material (44) melts for eliminating the short circuit. Besides, the printing conductive parts (50) may be made of an ink that melts at a temperature lower than the ignition temperature thereof so that short circuit is eliminated by melting a corresponding printing conductive part (50).

Further, in the discharge devices (40) of the present embodiments, the rod-like or linear discharge needles (the discharge pats) (61) are employed in the discharge electrodes (41). However, the discharge parts (61) are not necessarily in the form of a rod and may be in any shape such as a triangular shape of which tip end is tapered or in a cylindrical shape.

In Embodiment 3, an ABS resin to which carbon fiber is added is used as the electrically diffusible material. However, the electrically diffusible material is not limited thereto and any material may be used such as a synthetic rubber such as a butyl rubber, or another material.

Figure 12:
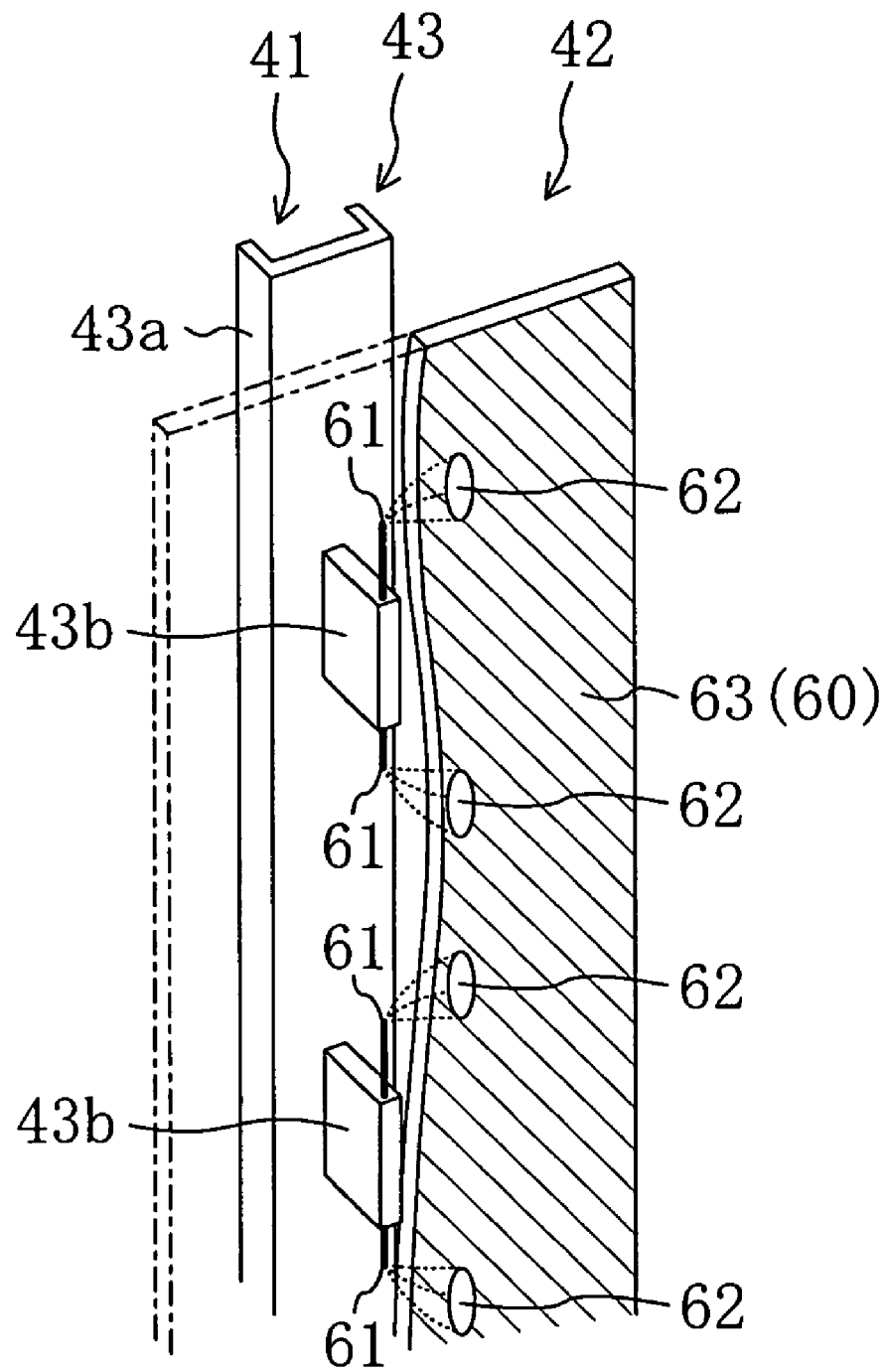
FIG. 12 is an enlarged perspective view of a major part of a discharge device, as one example, according to another embodiment.

Further, in Embodiment 3, the resistor (60) of an electrically diffusible material is provided in the current carrying path between the discharge parts (61) and the power source means (45). However, as shown in FIG. 12, the resistor (60) of an electrically diffusible material may be provided at the counter side support member (63) serving as the current carrying path between the counter parts (62) and the power source means (45). In this case, also, effects of suppressing the spark occurrence and preventing ignition and fuming of the resistor (60) can be obtained as in Embodiment 3.

Figure 13:
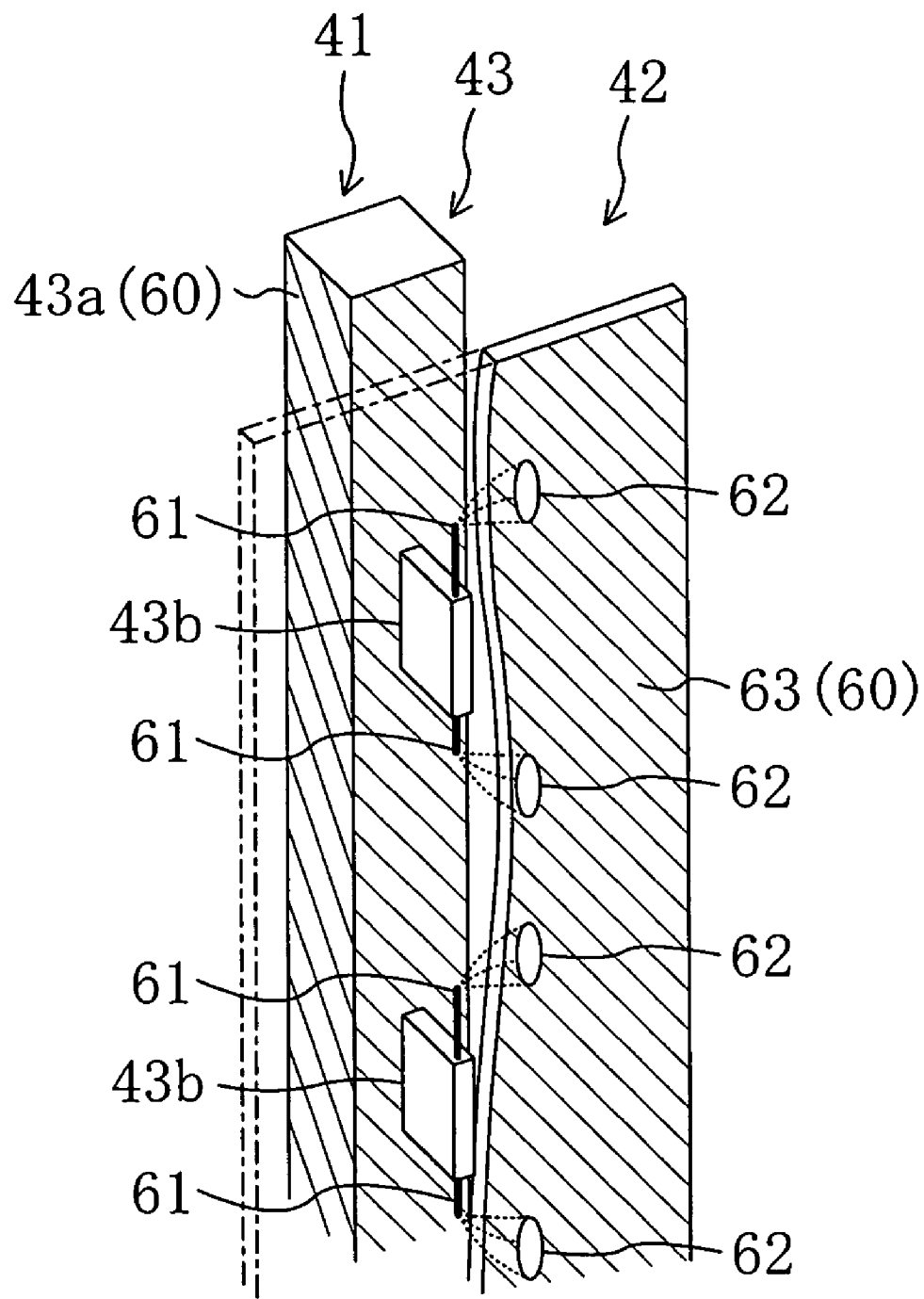
FIG. 13 is an enlarged perspective view of a major part of a discharge device, as one example, according to another embodiment.

In addition, as shown in FIG. 13, the resistor (60) of an electrically diffusible material may be provided on each of the discharge parts (61) side and the counter parts (62) side. In this case, the resistors (60) reduce the discharge current further effectively, further increasing the effect of suppressing the spark occurrence and of preventing ignition and fuming of the resistors (60).

INDUSTRIAL APPLICABILITY

As described above, the present invention is useful for discharge devices for performing streamer discharge between a discharge electrode and a counter electrode and for air purifiers having such a discharge device.

The invention claimed is:

1. A discharge device, which includes a discharge electrode including a plurality of discharge parts and a counter electrode including a plurality of counter parts confronting the discharge parts, for performing streamer discharge by applying voltage to both the electrodes by mower source, wherein:
a resistor is provided in a current carrying path between the power source and the counter parts,
the resistor is made of a conductive resin material, and
the resin material melts at a temperature lower than an ignition temperature thereof.

2. A discharge device, which includes a discharge electrode including a plurality of discharge parts and a counter electrode including a plurality of counter parts confronting the discharge parts, for performing streamer discharge by applying voltage to both the electrodes by a power source,
a resistor is provided in a current carrying path between the power source and the counter parts,
wherein the counter electrode includes a counter side support member for supporting the plurality of counter parts, and
the counter side support member is composed of the resistor.

3. The discharge device of claim 2,
wherein the counter electrode includes the plurality of counter parts and a plurality of counter side support members for supporting the counter parts.

4. A discharge device, which includes a discharge electrode including a plurality of discharge parts and a counter electrode including a plurality of counter parts confronting the discharge parts, for performing streamer discharge by applying voltage to both the electrodes by a power source,
a resistor is provided in a current carrying path between the power source and the counter parts,
wherein the counter electrode is provided with a resin material that melts at a temperature lower than an ignition temperature thereof, a conductive part for allowing the counter parts to be conductive with the power source is formed at the resin material, and the resistor is provided at the conductive part.

5. An air purifier, which includes a discharge device for performing streamer discharge between a discharge electrode and a counter electrode, for performing air purification of to-be-treated air by allowing the to-be-treated air to flow between the electrodes, wherein the discharge device is the discharge device of any one of claims 1, 2 and 4.

* * * * *